United States Patent
Cui et al.

(10) Patent No.: US 9,519,654 B2
(45) Date of Patent: Dec. 13, 2016

(54) METHOD, DEVICE, PROCESSING CENTER AND SYSTEM FOR DESKTOP SYNCHRONIZATION

(71) Applicant: Tencent Technology (Shenzhen) Company Limited, Shenzhen (CN)

(72) Inventors: Xiaolin Cui, Shenzhen (CN); Xuan Luo, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 22 days.

(21) Appl. No.: 14/413,384

(22) PCT Filed: Jul. 10, 2013

(86) PCT No.: PCT/CN2013/079142
§ 371 (c)(1),
(2) Date: Jan. 7, 2015

(87) PCT Pub. No.: WO2014/012449
PCT Pub. Date: Jan. 23, 2014

(65) Prior Publication Data
US 2015/0154224 A1 Jun. 4, 2015

(30) Foreign Application Priority Data
Jul. 19, 2012 (CN) .......................... 2012 1 0251076

(51) Int. Cl.
*G06F 9/44* (2006.01)
*G06F 17/30* (2006.01)
(Continued)

(52) U.S. Cl.
CPC ....... *G06F 17/30174* (2013.01); *G06F 9/4443* (2013.01); *G06F 9/52* (2013.01); *G06F 8/61* (2013.01)

(58) Field of Classification Search
USPC ......................................................... 717/126
See application file for complete search history.

(56) References Cited

U.S. PATENT DOCUMENTS 9,208,049 B2 * 12/2015 Cui ..................... G06F 11/2056
2002/0032763 A1 * 3/2002 Cox ....................... G06F 9/4443
709/223
(Continued)

FOREIGN PATENT DOCUMENTS

CN 1392477 A 1/2003
CN 101404023 A 4/2009
(Continued)

OTHER PUBLICATIONS

First CN Search Report and Office Action for Chinese Application No. 201210251076.2, dated Mar. 5, 2014.
(Continued)

*Primary Examiner* — Marina Lee
(74) *Attorney, Agent, or Firm* — Patterson & Sheridan, LLP

(57) ABSTRACT

The present invention provides a method, device, processing center and system for desktop synchronization and relates to the technical field of network. The method comprises the steps of: obtaining desktop data from a processing center; determining whether an application program corresponding to the desktop data has been installed; associating the desktop data with the corresponding application program if it is determined that the corresponding application program has been installed. The present invention resolves the problem that the present cloud storage scheme could only simply store and synchronize files or folders, and achieves the effects that the desktop can be synchronized across each platforms, and the files in the desktop data can be used, edited and modified after the synchronization across plat-
(Continued)

forms, by associating the locally application program with the desktop data while synchronizing the desktop data.

17 Claims, 7 Drawing Sheets

(51) Int. Cl.
*G06F 9/52* (2006.01)
*G06F 9/445* (2006.01)

(56) References Cited

U.S. PATENT DOCUMENTS

| | | | | |
|---|---|---|---|---|
| 2010/0036929 | A1* | 2/2010 | Scherpa | G06Q 10/10 709/207 |
| 2011/0209064 | A1* | 8/2011 | Jorgensen | G06F 9/4445 715/733 |
| 2012/0150801 | A1* | 6/2012 | Mantri | G06F 17/3007 707/626 |
| 2013/0013560 | A1* | 1/2013 | Goldberg | G06F 17/30174 707/634 |
| 2013/0124638 | A1* | 5/2013 | Barreto | G06F 15/16 709/205 |
| 2013/0268480 | A1* | 10/2013 | Dorman | G06F 17/30176 707/608 |
| 2013/0275398 | A1* | 10/2013 | Dorman | G06F 17/30126 707/693 |
| 2013/0275509 | A1* | 10/2013 | Micucci | H04L 67/02 709/204 |
| 2013/0339439 | A1* | 12/2013 | Deng | H04L 67/1095 709/204 |
| 2014/0075130 | A1* | 3/2014 | Bansal | G06F 17/30194 711/153 |
| 2014/0149348 | A1* | 5/2014 | Choi | G06F 8/65 707/624 |
| 2014/0258374 | A1* | 9/2014 | Suryanarayanan | H04L 67/1023 709/203 |
| 2014/0258450 | A1* | 9/2014 | Suryanarayanan | H04L 67/1097 709/217 |
| 2014/0258717 | A1* | 9/2014 | Baek | G06F 21/6218 713/165 |
| 2014/0298108 | A1* | 10/2014 | Cui | G06F 11/2056 714/39 |
| 2015/0112927 | A1* | 4/2015 | Lee | G06F 17/30233 707/610 |
| 2015/0127607 | A1* | 5/2015 | Savage | G06F 17/30194 707/610 |
| 2015/0154224 | A1* | 6/2015 | Cui | G06F 9/52 707/620 |

FOREIGN PATENT DOCUMENTS

| | | |
|---|---|---|
| CN | 102110031 A | 6/2011 |
| CN | 102176695 A | 9/2011 |
| CN | 102306189 A | 1/2012 |
| CN | 102355503 A | 2/2012 |
| CN | 102546777 A | 7/2012 |
| CN | 102819461 A | 12/2012 |

OTHER PUBLICATIONS

Second CN Search Report and Office Action for Chinese Application No. 201210251076.2, dated Oct. 27, 2014.
Third CN Search Report and Office Action for Chinese Application No. 201210251076.2, dated Apr. 28, 2015.
PCT Search Report and Written Opinion for PCT/CN2013/079142, dated Sep. 12, 2013.

* cited by examiner

METHOD, DEVICE, PROCESSING CENTER AND SYSTEM FOR DESKTOP SYNCHRONIZATION

FIELD OF THE INVENTION

The invention relates to the technical field of network, and particularly, to a method, device, processing center and system for desktop synchronization.

BACKGROUND

A desktop is a quick access interface provided to a user by an operating system. The desktop typically includes a graphical interface and a number of icons, taskbars and sidebars located in the graphical interface. These icons may be a specific file or folder, or a shortcut of a file or folder, or a shortcut of an application program.

There have been several cloud storage schemes in the prior art, such as, the network disk and cloud disk services launched by major Internet companies. These services can synchronize files across different platforms. Taking utilizing a network disk to synchronize files or folders in desktops across different platforms for example, specific process of cloud storage may include the following steps: firstly, a user downloads and installs a network disk application program on different platforms; then, the user synchronizes the files or folders in the desktop of one of the platforms to the cloud with the installed network disk application program, and particularly, the user may drag the files or folders in the desktop into the interface of the disk application program so as to activate the synchronization, or specify the files or folders in the desktop as a fixed synchronization path for the network disk application program, which performs real-time synchronizing when determining that the files or folders in the desktop have changed; lastly, the user downloads the files or folders stored in the cloud onto another platform with the network disk application program. With this, the user can use the files or folders in the desktop of the initial platform on another platform.

SUMMARY OF THE INVENTION

Applicants of the present invention found at least the following problems in the prior art. In the existing cloud storage schemes, the files or folders are only simply stored and synchronized; however, the user cannot easily edit and process the files or folders across different platforms, because various platforms have different file processing capacities and processing manners. For example, Windows platform typically used on computers has better processing capacity than Android platform typically used on smart phones.

In order to resolve the problem that the present cloud storage scheme could only simply store and synchronize files or folders, the disclosure provides a method, device, processing center and system for desktop synchronization.

According to an aspect of the invention, a method for desktop synchronization is provided, wherein the method includes the steps of: obtaining desktop data from a processing center; determining whether an application program corresponding to the desktop data has been installed; and associating the desktop data with the corresponding application program, if it is determined that the corresponding application program has been installed.

According to another aspect of the invention, an apparatus for desktop synchronization is provided, wherein the apparatus includes: a data obtaining module, configured to obtain desktop data from a processing center; a program determining module, configured to determine whether an application program corresponding to the desktop data has been installed; and a program associating module, configured to associate the desktop data with the corresponding application program, if the program determining module determines that the corresponding application program has been installed.

According to another aspect of the invention, a terminal is provided, wherein the terminal includes the abovementioned apparatus for desktop synchronization.

According to another aspect of the invention, a processing center which includes at least one server is provided, wherein the processing center includes: a data receiving module, configured to receive desktop data uploaded by a terminal; a data storing module, configured to store the desktop data; and a data sending module, configured to send the desktop data to the terminal; wherein the desktop data includes at least one set of data selected from a group consisting of: a file and an open mode corresponding to the file, a shortcut and a file or folder pointed to by the shortcut, and a shortcut and application program information corresponding to the shortcut.

According to another aspect of the invention, a system for desktop synchronization is provided, wherein the system includes the abovementioned terminal and/or the abovementioned processing center.

According to another aspect of the invention, a computer-readable storage medium with computer programs including program codes stored thereon is provided. When being executed on a computing device, the program codes perform each step of the abovementioned method for desktop synchronization.

Technical solutions provided by the embodiments of the present invention bring at least the following beneficial effects. The present invention resolves the problem that the present cloud storage scheme could only simply store and synchronize files or folders and achieves the effects that the desktop data can be synchronized across platforms, and the files in the desktop data can be used, edited and modified after the synchronization across platforms, by associating the locally application program with the desktop data while synchronizing the desktop data.

DESCRIPTION OF THE DRAWINGS

In order to more clearly illustrate the technical solutions of the embodiments of the present invention, accompanying drawings used in description of the embodiments will be briefly described in the following. Obviously, the drawings described herein are only examples of the present invention, and those skilled in the art may achieve other drawings based on these drawings without creative work.

DETAILED DESCRIPTION

In order to make the objects, technical solutions and advantages of the invention more apparent, embodiments of the invention will be further illustrated in details in connection with accompanying drawings.

Figure 1:
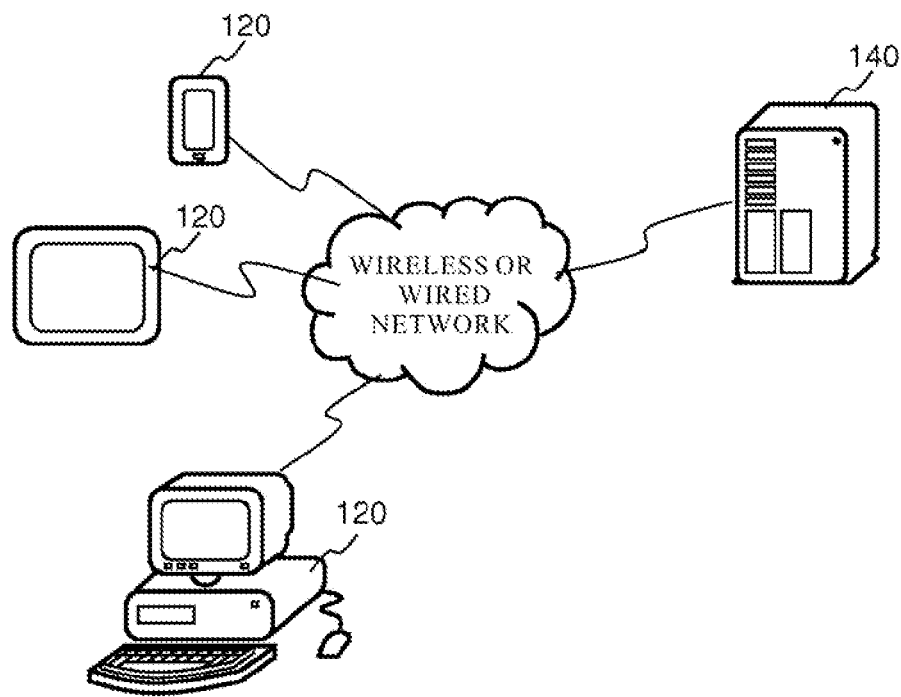
FIG. 1 is a structural schematic diagram showing the implementing environment involved by a method for desktop synchronization according to an embodiment of the invention.

Referring to FIG. 1, FIG. 1 illustrates a structural schematic diagram showing the implementing environment involved by a method for desktop synchronization according to an embodiment of the invention. The implementing environment may include at least one terminal 120 and a processing center 140.

The terminal 120 may be a smart phone, a tablet, a desktop computer, a notebook and an ebook reader, etc. These terminals include, but not limited to, terminals based on Windows platform produced by Microsoft Inc. in U.S., Android platform or Chrome platform produced by Google Inc. in U.S., Mac platform produced by Apple Inc. in U.S., or Symbian platform produced by Nokia Inc. in Finland.

The processing center 140 is a cloud computing center composed of one or more servers, with predetermined application programs operated thereon. The processing center 140 has a data storage function and a function for data synchronization with the terminal 120. Data synchronization with the terminal 120 particularly includes the following two situations that: the terminal 120 uploads data to the processing center 140 and the terminal 120 downloads data from the processing center 140. The terminal 120 may interconnect and communicate with the processing center 140 over a wireless network or a wired network.

Embodiment I

Figure 2:
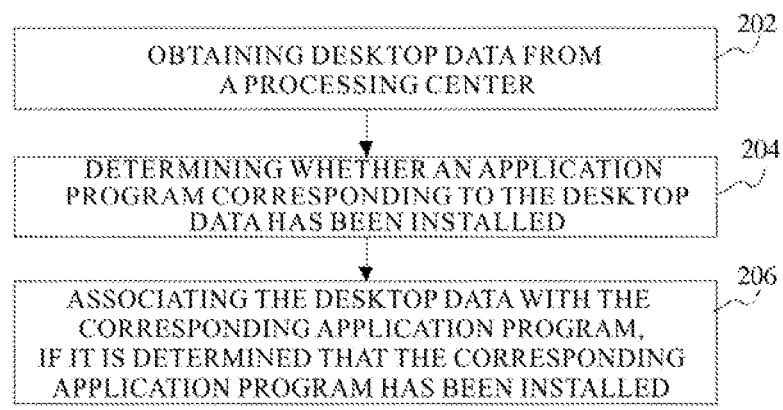
FIG. 2 is a flow diagram showing a method for desktop synchronization according to a first embodiment of the invention.

Referring to FIG. 2, FIG. 2 illustrates a flow diagram showing a method for desktop synchronization according to a first embodiment of the invention. The method for desktop synchronization may be used in the terminal 120 shown in FIG. 1. The method for desktop synchronization may include Step 202, Step 204 and Step 206.

In Step 202, desktop data are obtained from a processing center.

The terminal may obtain desktop data from a processing center located in the cloud after startup. The desktop data are used to generate and display a desktop. The desktop data may be pre-stored in the processing center located in the cloud by current terminal or other terminals. The desktop data includes at least one set of data selected from a group consisting of: a file and an open mode corresponding to the file, a shortcut and a file or folder pointed to by the shortcut, and a shortcut and application program information corresponding to the shortcut.

In Step 204, it is determined whether an application program corresponding to the desktop data has been installed.

After obtaining the desktop data, the terminal may determine whether it has installed the corresponding application program according to information such as "open mode corresponding to the file", "application program information" and the like contained in the desktop data. For example, the terminal obtains a file with a suffix ".docx", and an open mode corresponding to the file is Word application program produced by Microsoft Inc. in U.S. Thereby, the terminal determines whether it has installed the Word application program.

In Step 206, the desktop data is associated with the corresponding application program, if it is determined that the corresponding application program has been installed.

The terminal associates the desktop data with the installed application program, if it determines that it has installed the corresponding application program. In particular, the "associating" may include associating the installed application program as a current open mode of a file, or associating the installed application program as the object currently pointed to by the a shortcut. For example, the terminal associates the Word application program as the current open mode of the file with a suffix ".docx", if it determines that it has installed the Word application program, so that when the user needs to open a file with a suffix ".docx", he may directly use the Word application program to open the file.

In conclusion, the method for desktop synchronization provided by the embodiment resolves the problem that the present cloud storage scheme could only simply store and synchronize files or folders and achieves the effects that the desktop can be synchronized across platforms, and the files in the desktop data can be used, edited and modified after the synchronization across platforms, by associating the locally application program with the desktop data while synchronizing the desktop data.

Embodiment II

The application scenario is a desktop containing a plurality of icons, wherein each of the icons corresponds to a file or a folder. The user wants to use the same desktop in both a first terminal and a second terminal different from the first terminal. It is assumed that the first terminal is a notebook computer using the Windows platform and the second terminal is a smart phone using the Andriod platform.

Figure 3:
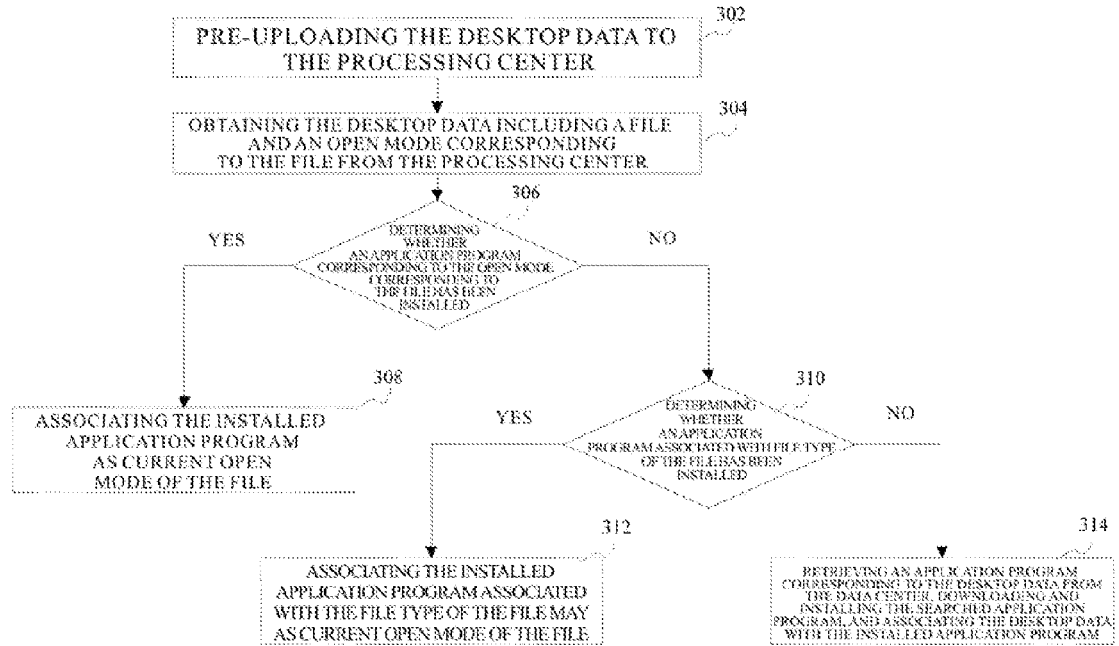
FIG. 3 is a flow diagram showing a method for desktop synchronization according to a second embodiment of the invention.

Referring to FIG. 3, FIG. 3 illustrates a flow diagram showing a method for desktop synchronization according to a second embodiment of the invention. The method for desktop synchronization may be used in the terminal 120 shown in FIG. 1. The method for desktop synchronization may include Step 302, Step 304, Step 306, Step 308, Step 310, Step 312 and Step 314.

In Step 302, the desktop data are pre-uploaded to the processing center.

The first terminal pre-uploads the desktop data to the processing center located in the cloud for storing. For example, the first terminal may upload the desktop data to the processing center every predetermined time interval; or the first terminal may upload the desktop data to the processing center when the desktop data changes. The desktop contains a plurality of icons, wherein each of the icons corresponds to a file or a folder. At the moment, the first terminal uploads the desktop data including a file and an open mode corresponding to the file to the processing center. For example, the file may be "A work plan for the week.doc" and the open mode corresponding to the file may be "Word 20xx application program"; or the file may be "Memories of xx.rmvb" and the open mode corresponding to the file may be "A1 video player". Furthermore, a folder may be regarded as a collection of 0 to multiple files, the description of which is thus omitted.

In Step 304, the desktop data including files and open modes corresponding to the files are obtained from the processing center.

When the second terminal starts up, it may obtain the desktop data from the processing center located in the cloud, and generates a desktop with the desktop data for displaying or updating. In particular, the desktop data obtained by the second terminal from the processing center includes files and open modes corresponding to the files. Herein, the files may be contained in a folder.

In Step 306, it is determined whether an application program corresponding to the open mode corresponding to the file has been installed. If that is the case, the method proceeds to Step 308; otherwise, the method proceeds to Step 310.

Because the desktop data includes files and open modes corresponding to the files, after obtaining the desktop data, the second terminal may determine whether it has installed the application program corresponding to the open mode corresponding to each of the files. For example, if the desktop data includes the file named "A work plan for the week.doc" and the open mode "Word 20xx application program" corresponding to the file, the second terminal may determine whether it has installed the Word 20xx application program.

In Step 308, since it has determined that the corresponding application program has been installed, the installed application program may be associated as the current open mode of the file.

The second terminal associates the installed application program as current open mode of the file, if it has determined that it has installed the corresponding application program. For example, the second terminal has determined that it has installed the Word 20xx application program, and then it may associate the installed Word 20xx application program as the current open mode of the file named "A work plan for the week.doc".

In Step 310, since it is determined that the corresponding application program has not been installed, it may be further determined whether an application program associated with the file type of the file has been installed. If that is the case, the method proceeds to Step 312; otherwise, the method proceeds to Step 314.

If the second terminal determines that it has not installed the corresponding application program, it may further determine whether it has installed an application program associated with file type of the file. For example, the second terminal determines that it has not installed the Word 20xx application program, and then it will further determine whether it has installed an application program associated with the file type of the file with a suffix ".docx".

In Step 312, since it is determined that an application associated with file type of the file has been installed, the installed application program associated with the file type of the file may be associated as the current open mode of the file.

If the second terminal determines that it has installed an application program associated with file type of the file, it associates the installed application program associated with the file type of the file as the current open mode of the file. For example, if the second terminal determined that it has installed an Openoffice application program associated with the file type of the file with a suffix ".docx", it associates the installed Openoffice application program as the current open mode of the file named "A work plan for the week.doc".

In Step 314, since it is determined that the application program associated with file type of the file has not been installed, an application program corresponding to the desktop data may be retrieved from the data center, the retrieved application program will be downloaded and installed, and then the desktop data will be associated with the installed application program.

In particular, the second terminal retrieves an application program corresponding to the desktop data from the data center, downloads and installs the retrieved application program, and then associates the desktop data with the installed application program. Herein, the step of "associating" may include the following substeps: Substep 1, Substep 2 and Substep 3.

In Substep 1, the second terminal sends platform type information and the file type of the file to the processing center.

Assuming that the second terminal is a smart phone using the Android platform, the second terminal sends the platform type information "Android" and the file type ".doc" of the file to the processing center. The platform type information and file types of the files may be provided in a variety of forms. For example, the platform type information may be represented by an installation package type "APK" supported by the Android platform; and the file type of the file may be represented by Chinese character "纯文字文件 (plain text file)". Meanwhile, the second terminal may simultaneously send both the platform type information and the file type of the file to the processing center; or the second terminal may asynchronously send the platform type information and the file type of the file to the processing center. For example, the second terminal may send the platform type information to the processing center in Step 304.

In Substep 2, the second terminal receives an application program installation package fed back by the processing center according to the platform type information and the file type of the file.

The second terminal receives an application program installation package fed back by the processing center according to the platform type information and the file type of the file. In particular, the processing center may feed a download link back to the second terminal, according to the platform type information and the file type of the file; and the second terminal may download an application program installation package according to the download link. For example, the second terminal downloads an application program installation package named Quickoffice.apk.

In Substep 3, the second terminal installs the application program installation package and associates the installed application program as the current open mode of the file.

The second terminal may install the downloaded application program installation package and associate the installed application program as the current open mode of the file. For example, the second terminal may install the downloaded application program installation package named Quickoffice.apk, and associate the installed Quickoffice application program as the current open mode of the file.

It should be noted that Step 310 and Step 312 are optional steps. If the determination in Step 306 is "NO", the method may directly go to Step 314.

In conclusion, the method for desktop synchronization provided by the embodiment resolves the problem that the present cloud storage scheme could only simply store and synchronize files or folders, and achieves the effects that the desktop can be synchronized across platforms, and the files in the desktop data can be used, edited and modified after the synchronization across platforms, by associating the locally application program with the desktop data while synchronizing the desktop data. Meanwhile, the method for desktop synchronization enables the terminal to retrieve an application program corresponding to the desktop data from the processing center, download and install the retrieved application program, and associate the installed application program with the desktop data, so that the terminal can always open the files in the desktop data for using, editing and modifying.

Embodiment III

The application scenario is a desktop containing a plurality of icons, wherein each of the icons corresponds to a shortcut of a file or a folder. The user wants to use the same desktop in both a first terminal and a second terminal different from the first terminal. It is assumed that the first terminal is a tablet using the Chrome platform and the second terminal is a desktop computer using the Mac platform.

Figure 4:
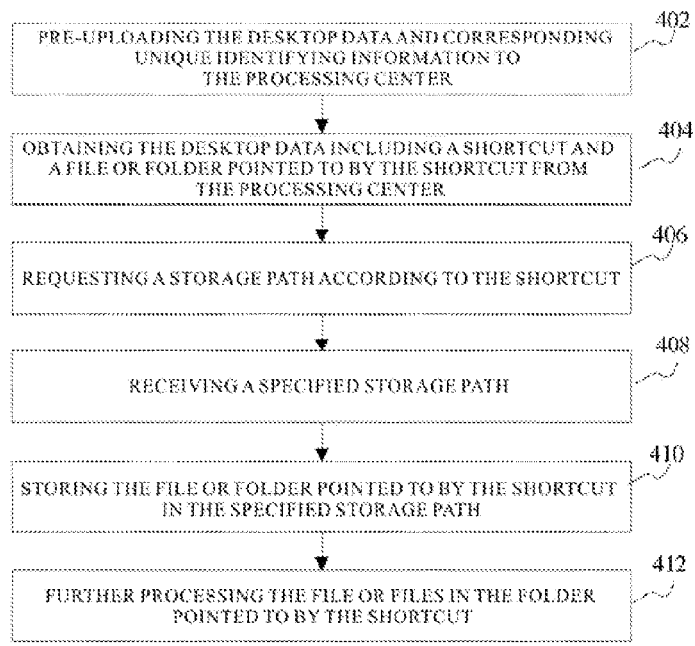
FIG. 4 is a flow diagram showing a method for desktop synchronization according to a third embodiment of the invention.

Referring to FIG. 4, FIG. 4 illustrates a flow diagram showing a method for desktop synchronization according to a third embodiment of the invention. The method for desktop synchronization may be used in the terminal 120 shown in FIG. 1. The method for desktop synchronization may include Step 402, Step 404, Step 406, Step 408, Step 410 and Step 412.

In Step 402, the desktop data and corresponding unique identifying information are pre-uploaded to the processing center.

Since the processing center may store desktop data from more than one user and the desktop data needs to be synchronized across different terminals, the processing center may store the desktop data according to the user's unique identifying information. In this case, when pre-uploading the desktop data to the processing center, the first terminal should simultaneously upload the corresponding unique identifying information to the processing center. The user's unique identifying information may include any one selected from a group consisting of a username, an e-mail address, a mobile number, a phone number and an instant communication number. In general, the first terminal may use a group of a username and corresponding password as unique identifying information.

The desktop contains a plurality of icons, wherein each of the icons corresponds to a shortcut of a file or a folder. Therefore, the first terminal needs to upload the desktop data, including not only the shortcut but also the file or folder pointed to by the shortcut, to the processing center.

In particular, when the first terminal needs to upload the shortcut of a file or folder, the first terminal may look up the file or folder pointed to by the shortcut according to path information contained in the shortcut, and simultaneously upload the file or folder to the processing center. For example, if the first terminal needs to upload the desktop shortcut of a folder named "learning materials" and stored in disk D, it will upload not only the shortcut but also the folder named "learning materials" and stored on disk D to the processing center. Of course, for files or files in the folder, the open modes corresponding to the files should also be uploaded.

In Step 404, the desktop data including shortcuts and files or folders pointed to by the shortcuts are obtained from the processing center.

When the second terminal starts up, it may obtain the desktop data from the processing center located in the cloud, and generate a desktop with the desktop data for displaying or updating. In particular, the step of obtaining the desktop data from the processing center may include Substep 1 and Substep 2.

In Substep 1, the second terminal sends unique identifying information to the processing center, wherein the unique identifying information includes any one selected from a group consisting of a username, an e-mail address, a mobile number, a phone number and an instant communication number.

In the embodiment, the unique identifying information is the username and password.

In Substep 2, the second terminal receives desktop data corresponding to the unique identifying information fed back by the processing center.

In the embodiment, the desktop data includes the shortcut and the file or folder pointed to by the shortcuts.

In Step 406, a storage path is requested according to the shortcut.

When the desktop data includes the shortcut and the file or folder pointed to by the shortcuts, the second terminal firstly saves and displays the shortcut in the local desktop, and simultaneously requests the storage path from the user or system according to the shortcut, for example, by sending a request to the user via an inquiry and prompt box.

In Step 408, a specified storage path is received.

In the step, the second terminal may receive a storage path input or selected by the user; or the second terminal may a storage path specified by the system, for example, a default path specified by the system.

In Step 410, the file or folder pointed to by the shortcut is stored in the specified storage path.

In the step, the second terminal may store the file or folder pointed to by the shortcut in the storage path specified by user, and point the shortcut to the stored file or folder.

In Step 412, optionally, the file or files in the folder pointed to by the shortcut are further processed.

It should be noted that the desktop data also includes the open mode corresponding to the file pointed to by the shortcut or each file in the folder pointed to by the shortcut. The second terminal further associates each of the files to an application program, seeing the process of steps 306 to 314 in the first embodiment for details, the description of which is thus omitted.

In conclusion, the method for desktop synchronization provided by the embodiment resolves the problem that the present cloud storage scheme could only simply store and synchronize files or folders and achieves the effects that the desktop can be synchronized across platforms, and the files in the desktop data can be used, edited and modified after the synchronization across platforms, by associating the locally application program or the newly installed application program with the desktop data while synchronizing the desktop data. Meanwhile, the method for desktop synchronization enables the terminal to simultaneously synchronize the file or folder pointed to by the shortcut while synchronizing the shortcut, and thus resolves the problem that the shortcut is unusable when only the shortcut is synchronized, and achieves the effect that the shortcut will still be able to be used on the current terminal after the synchronization.

Embodiment IV

The application scenario is a desktop containing a plurality of icons, wherein each of the icons corresponds to a shortcut of an application program. The user wants to use the same desktop in both a first terminal and a second terminal different from the first terminal. It is assumed that the first terminal is a smart phone using the IOS platform and the second terminal is a smart phone using the Symbian platform.

Figure 5:
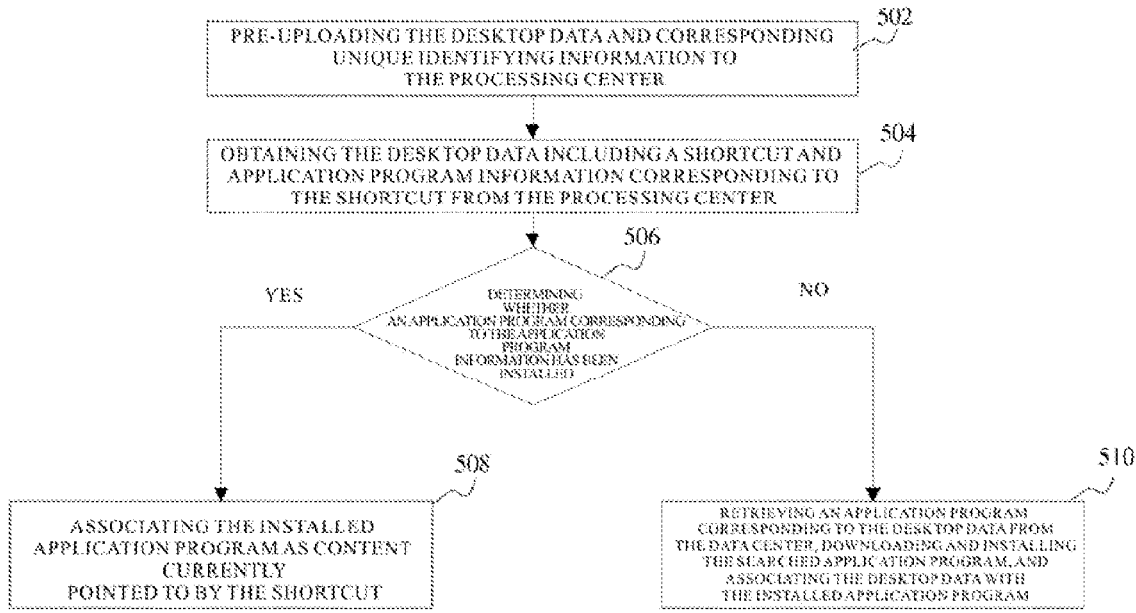
FIG. 5 is a flow diagram showing a method for desktop synchronization according to a fourth embodiment of the invention.

Referring to FIG. 5, FIG. 5 illustrates a method for desktop synchronization according to a fourth embodiment of the invention. The method for desktop synchronization may be used in the terminal 120 shown in FIG. 1. The method for desktop synchronization may include Step 502, Step 504, Step 506, Step 508 and Step 510.

In Step 502, the desktop data and corresponding unique identifying information are pre-uploaded to the processing center.

Since the processing center may store desktop data from more than one user and the desktop data needs to be synchronized across different terminals, the processing center may store the desktop data according to the user's unique identifying information. In this case, when pre-uploading the desktop data to the processing center, the first terminal should simultaneously upload the corresponding unique identifying information to the processing center. The user's unique identifying information may include any one selected from a group consisting of a username, an e-mail address, a mobile number, a phone number and an instant communication number. In general, the first terminal may use a pair of an e-mail address and corresponding password as the unique identifying information.

In particular, when the first terminal needs to upload the shortcut of an application program to the processing center, the first terminal may look up the application program pointed to by the shortcut according to path information contained in the shortcut, and simultaneously upload the application program information as a part of the desktop data to the processing center. The application program information may include at least one selected from a group consisting of: a name, a version number, and a Message Digest Algorithm Fifth Edition (MD5) of the application program. For example, when uploading a shortcut of QQ application program produced by Tencent Inc. in China, the first terminal should upload not only the shortcut but also application program information corresponding to the application program, such as, the application program name "QQ".

In Step 504, the desktop data including a shortcut and application program information corresponding to the shortcut are obtained from the processing center.

When the second terminal starts up, it may obtain the desktop data from the processing center located in the cloud, and generate a desktop with the desktop data for displaying or updating. In particular, the step of obtaining the desktop data from the processing center may include Substep 1 and Substep 2.

In Substep 1, the second terminal sends unique identifying information to the processing center, wherein the unique identifying information includes any one selected from a group consisting of a username, an e-mail address, a mobile number, a phone number and an instant communication number.

In the embodiment, the unique identifying information is the e-mail address and corresponding password.

In Substep 2, the second terminal receives desktop data corresponding to the unique identifying information fed back by the processing center.

In the embodiment, the desktop data includes the shortcut and application program information corresponding to the shortcut. For example, the desktop data may include the QQ shortcut and the application program name "QQ" corresponding to the QQ shortcut.

In Step 506, it is determined whether an application program corresponding to the application program information has been installed. If that is the case, the method proceeds to Step 508; otherwise, the method proceeds to Step 510.

Because the desktop data includes the shortcut and application program information corresponding to the shortcut, after obtaining the desktop data, the second terminal may determine whether it has installed the application program corresponding to the application program information. For example, the second terminal may determine whether it has installed the QQ application program.

In Step 508, since it has determined that the corresponding application program has been installed, the installed application program may be associated as the object currently pointed to by the shortcut.

The second terminal associates the installed application program as the object currently pointed to by the shortcut, if it has determined that it has installed the corresponding application program. For example, the second terminal has determined that it has installed the QQ application program, and then it may associate the installed QQ application program as the object currently pointed to by the QQ shortcut contained in the desktop data.

In Step 510, since it is determined that the corresponding application program has not been installed, an application program corresponding to the desktop data may be retrieved from the data center, and the retrieved application program will be downloaded and installed, and then the desktop data will be associated with the installed application program.

If the second terminal determines that it has not installed the corresponding application program, it will retrieve an application program corresponding to the desktop data from the data center, download and install the retrieved application program, and then associate the desktop data with the installed application program. Herein, Step 510 may include Substep 1, Substep 2 and Substep 3.

In Substep 1, the second terminal sends platform type information and application program information to the processing center.

In the embodiment, the second terminal sends the platform type information "Symbian" and the application program information "QQ" to the processing center. The platform type information may be provided in a variety of forms. For example, the platform type information may be represented by an installation package type "sis" supported by the Symbian platform. Meanwhile, the second terminal may simultaneously send both the platform type information and the application program information to the processing center; or the second terminal may asynchronously send the platform type information and the application program information to the processing center, for example, the second terminal may send the platform type information to the processing center in Step 504.

In Substep 2, the second terminal receives an application program installation package fed back by the processing center according to the platform type information and the application program information.

The second terminal receives an application program installation package fed back by the processing center according to the platform type information and the application program information. In particular, the processing center may feed a download link back to the second terminal, according to the platform type information and the application program information; and the second terminal may download an application program installation package according to the download link. For example, the second terminal downloads an application program installation package named QQ2009.sis.

In Substep 3, the second terminal installs the application program installation package and associates the installed application program as the object currently pointed to by the shortcut.

The second terminal may install the downloaded application program installation package and associate the installed application program as the object currently pointed to by the shortcut. For example, the second terminal may install the downloaded application program installation package named QQ2009.sis, and associate the installed QQ2009.sis application program as the object currently pointed to by the QQ shortcut.

It should be noted that Step 310 and Step 312 are optional steps. If the determination in Step 306 is "NO", the method may directly go to Step 314.

In conclusion, the method for desktop synchronization provided by the embodiment resolves the problem that the present cloud storage scheme could only simply store and synchronize files or folders, and achieves the effects that the desktop can be synchronized across platforms, and the files in the desktop data can be used, edited and modified after the synchronization across platforms, by associating the locally application program or the newly installed application program with the desktop data while synchronizing the desktop data. Meanwhile, the method for desktop synchronization enables the terminal to simultaneously synchronize the application program information corresponding to the shortcut while synchronizing the shortcut, and thus resolves the problem that the shortcut is unusable when only the shortcut is synchronized, and achieves the effect that the shortcut will still be able to be used on the current terminal after the synchronization.

It should be further noted that, in the above embodiment, the data uploaded to the processing center by the first terminal may be referred as desktop synchronization data, which includes desktop data or a combination of desktop data and corresponding unique identifying information. Additionally, the desktop data may include not only at least one set of data selected from a group consisting of: a file and an open mode corresponding to the file, a shortcut and a file or folder pointed to by the shortcut, and a shortcut and application program information corresponding to the shortcut, but also a screen resolution, wallpaper settings, network settings, email settings, browser favorites and other information.

Embodiment V

Figure 6:
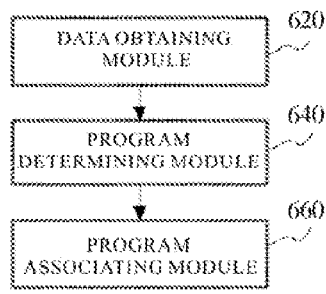
FIG. 6 is a structural schematic diagram showing an apparatus for desktop synchronization according to a fifth embodiment of the invention.

Referring to FIG. 6, FIG. 6 illustrates a flow diagram showing an apparatus for desktop synchronization according to a fifth embodiment of the invention. The apparatus for desktop synchronization may be implemented as the terminal 120 as shown in FIG. 1 or a part of it. The apparatus for desktop synchronization may include a data obtaining module 620, a program determining module 640 and a program associating module 660.

The data obtaining module 620 is configured to obtain desktop data from a processing center. The desktop data includes at least one set of data selected from a group consisting of: a file and an open mode corresponding to the file, a shortcut and a file or folder pointed to by the shortcut, and a shortcut and application program information corresponding to the shortcut.

The program determining module 640 is configured to determine whether an application program corresponding to the desktop data has been installed.

The program associating module 660 is configured to associate the desktop data with the corresponding application program, if the program determining module 640 determines that the corresponding application program has been installed. In particular, the step of "associating" may include associating the installed application program as the object currently pointed to by a shortcut. For example, if the terminal determines that it has installed the Word application program, it then associates the Word application program as the open mode of the file with a suffix ".docx", so that when the user needs to open a file with a suffix ".docx", he may directly use the Word application program to open the file In conclusion, the apparatus for desktop synchronization provided by the embodiment resolves the problem that the present cloud storage scheme could only simply store and synchronize files or folders, and achieves the effects that the desktop can be synchronized across platforms, and the files in the desktop data can be used, edited and modified after the synchronization across platforms, by associating the locally application program with the desktop data while synchronizing the desktop data.

Embodiment VI

In order to further illustrate the apparatus for desktop synchronization provided by the fifth embodiment, an embodiment is provided for the situation when the desktop data includes a file and the open mode corresponding to the file.

Figure 7:
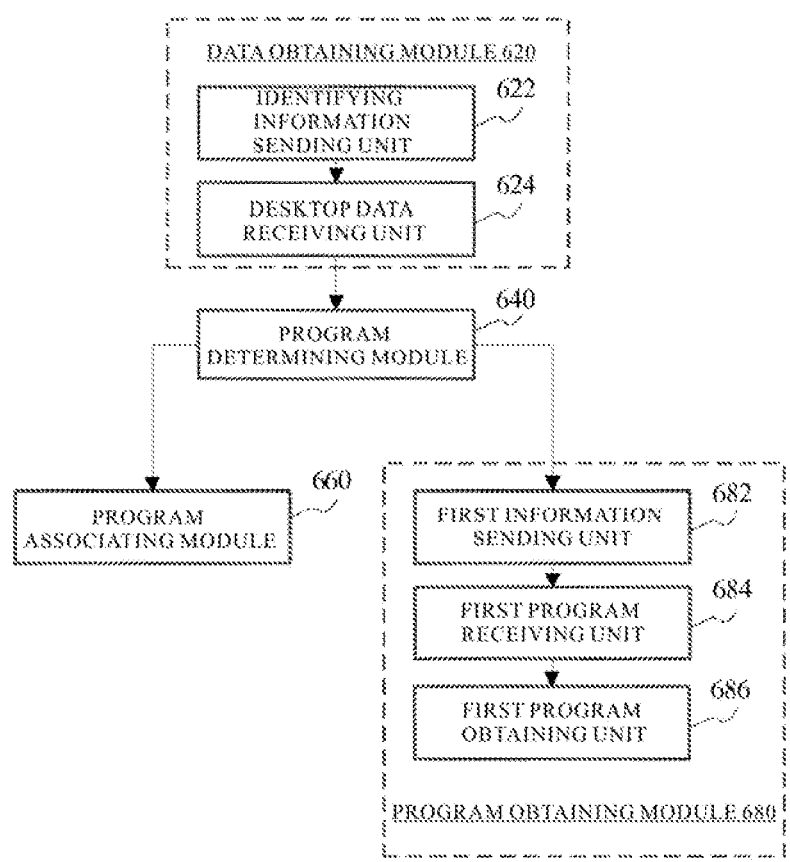
FIG. 7 is a structural schematic diagram showing an apparatus for desktop synchronization according to a sixth embodiment of the invention.

Referring FIG. 7, FIG. 7 illustrates a structural schematic diagram showing an apparatus for desktop synchronization according to a sixth embodiment of the invention. The apparatus for desktop synchronization may be implemented as the terminal 120 as shown in FIG. 1 or a part of it. The apparatus for desktop synchronization may include a data obtaining module 620, a program determining module 640, a program associating module 660 and a program obtaining module 680.

The data obtaining module 620 is configured to obtain desktop data including a file and the open mode corresponding to the file from a processing center. In particular, the data obtaining module 620 may include an identifying information sending unit 622 and a desktop data receiving unit 624. The identifying information sending unit 622 is configured to send unique identifying information to the processing center, wherein the unique identifying information includes any one of a username, an e-mail address, a mobile number, a phone number and an instant communication number. The desktop data receiving unit 624 is configured to receive desktop data corresponding to the unique identifying information fed back by the processing center.

The program determining module 640 is configured to determine whether an application program corresponding to the desktop data has been installed. When the desktop data includes a file and the open mode corresponding to the file, the program determining module 640 is particularly configured to determine whether an application program corresponding to the open mode of the file has been installed.

The program associating module 660 is configured to associate the desktop data with the corresponding application program, if the program determining module 640 determines that the corresponding application program has been installed. When the desktop data includes a file and the open mode corresponding to the file, the program associating module 660 is configured to associate the installed application program as the current open mode of the file, if the program determining module 640 determines that the corresponding application program has been installed.

The program obtaining module 680 is configured to retrieve an application program corresponding to the desktop data from the data center, download and install the retrieved application program, and then associate the desktop data with the installed application program, if the program determining module 640 determines that the corresponding application program has not been installed. In particular, the program obtaining module 680 may include a first information sending unit 682, a first program receiving unit 684 and a first program obtaining unit 686. The first information sending unit 682 is configured to send the platform type information and the file type of the file to the processing center, the first program receiving unit 684 is configured to receive an application program installation package fed back by the processing center according to the platform type information and the file type of the file; and the first program obtaining unit 686 is configured to install the application program installation package received by the first program receiving unit 684, and associate the installed application program as the current open mode of the file.

More preferably, when the program determining module 640 determines that the application program corresponding to the open mode corresponding to the file has not been installed, it may further determine whether an application associated with the open mode of the file has been installed.

In this case, the program associating module 660 is further configured to associate the application program associated with the open mode of the file as the current open mode of the file, if the program determining module 640 determines that the application program associated with the open mode of the file has been installed.

In conclusion, the apparatus for desktop synchronization provided by the embodiment resolves the problem that the present cloud storage scheme could only simply store and synchronize files or folders, and achieves the effects that the desktop can be synchronized across platforms, and the files in the desktop data can be used, edited and modified after the synchronization across platforms, by associating the locally application program with the desktop data while synchronizing the desktop data. Meanwhile, the apparatus for desktop synchronization enables the terminal to retrieve an application program corresponding to the desktop data from the processing center, download and install the retrieved application program, and associate the installed application program with the desktop data, so that the terminal can always open the files in the desktop data, for using, editing and modifying.

Embodiment VII

In order to further illustrate the apparatus for desktop synchronization provided by the sixth embodiment, an embodiment is provided for the situation when the desktop data includes a shortcut and a file or folder pointed to by the shortcut.

Figure 8:
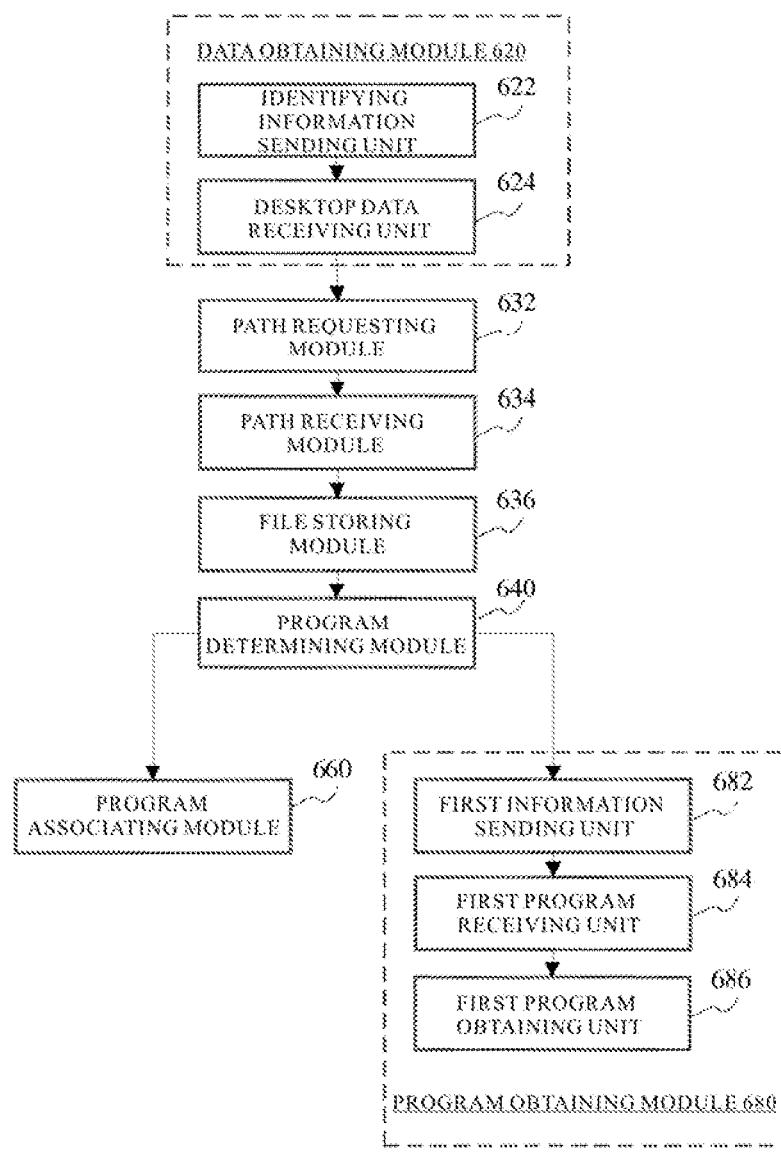
FIG. 8 is a structural schematic diagram showing an apparatus for desktop synchronization according to a seventh embodiment of the invention.

Referring FIG. 8, FIG. 8 illustrates a structural schematic diagram showing an apparatus for desktop synchronization according to a seventh embodiment of the invention. The apparatus for desktop synchronization may be implemented as the terminal 120 as shown in FIG. 1 or a part of it. The apparatus for desktop synchronization may include a data obtaining module 620, a path requesting module 632, a path receiving module 634, a file storing module 636, a program determining module 640, a program associating module 660 and a program obtaining module 680. The description of the data obtaining module 620, the program determining module 640, the program associating module 660 and the program obtaining module 680 may refer to the related description in the sixth embodiment.

Furthermore, since the desktop data received by the data obtaining module 620 includes the shortcut and the file or folder pointed to by the shortcut, the path requesting module 632 is configured to request a store path according to the shortcut obtained by the data obtaining module 620; the path receiving module 634 is configured to receive a specified store path; and the file storing module 636 is configured to store the file or folder pointed to by the shortcut in the specified store path. Thereafter, the program determining module 640, the program associating module 660 and the program obtaining module 680 may further process the file or each file in the folder.

In conclusion, the apparatus for desktop synchronization provided by the embodiment resolves the problem that the present cloud storage scheme could only simply store and synchronize files or folders, and achieves the effects that the desktop can be synchronized across platforms, and the files in the desktop data can be used, edited and modified after the synchronization across platforms, by associating the locally application program or the newly installed application program with the desktop data while synchronizing the desktop data. Meanwhile, the apparatus for desktop synchronization enables the terminal to simultaneously synchronize the file or folder pointed to by the shortcut while synchronizing the shortcut, and thus resolves the problem that the shortcut is unusable when the shortcut is synchronized merely, and achieves the effect that the shortcut will still be able to be used on the current terminal after the synchronization.

Embodiment VIII

In order to further illustrate the apparatus for desktop synchronization provided by the fifth embodiment, an embodiment is provided for the situation when the desktop data includes a shortcut and application program information corresponding to the shortcut.

Figure 9:
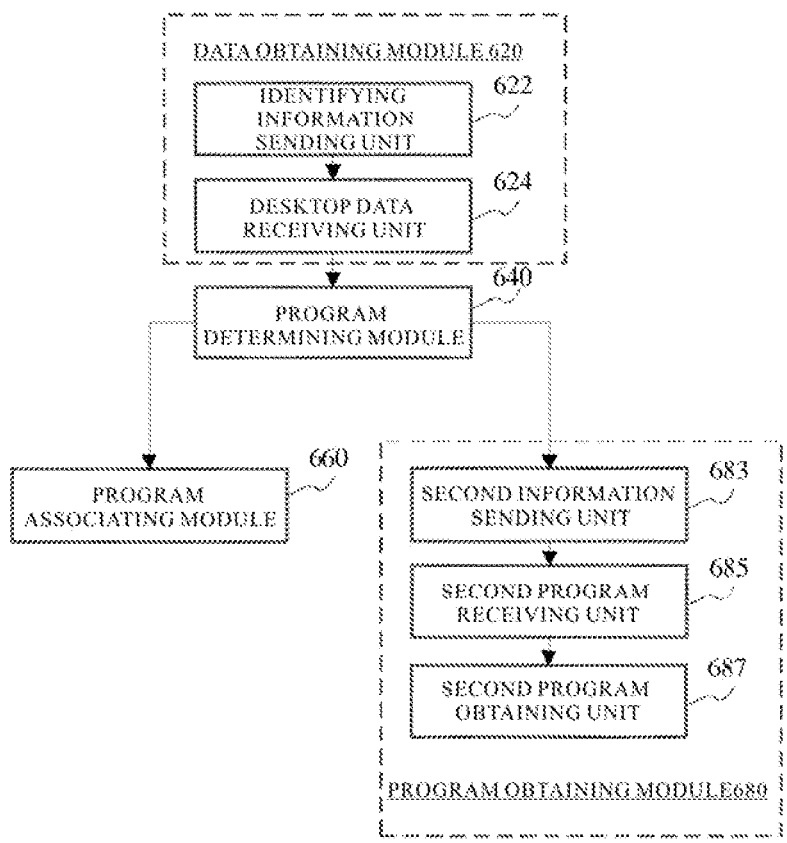
FIG. 9 is a structural schematic diagram showing an apparatus for desktop synchronization according to an eighth embodiment of the invention.

Referring to FIG. 9, FIG. 9 illustrates a structural schematic diagram showing an apparatus for desktop synchronization according to an eighth embodiment of the invention. The apparatus for desktop synchronization may be implemented as the terminal 120 as shown in FIG. 1 or a part of it. The apparatus for desktop synchronization may include a data obtaining module 620, a program determining module 640, a program associating module 660 and a program obtaining module 680.

The data obtaining module 620 is configured to obtain desktop data including a shortcut and application program information corresponding to the shortcut from a processing center. In particular, the data obtaining module 620 may include an identifying information sending unit 622 and a desktop data receiving unit 624. The identifying information sending unit 622 is configured to send unique identifying information to the processing center, wherein the unique identifying information including any one of a username, an e-mail address, a mobile number, a phone number and an instant communication number. The desktop data receiving unit 624 is configured to receive desktop data corresponding to the unique identifying information fed back by the processing center.

The program determining module 640 is configured to determine whether an application program corresponding to the desktop data has been installed. When the desktop data includes a shortcut and application program information corresponding to the shortcut, the program determining module 640 is particularly configured to determine whether an application program corresponding to the application program information has been installed.

The program associating module 660 is configured to associate the desktop data with the corresponding application program, if the program determining module 640 determines that the corresponding application program has been installed. When the desktop data includes a shortcut and application program information corresponding to the shortcut, the program associating module 660 is configured to associate the installed application program as the object currently pointed to by the shortcut, if the program determining module 640 determines that the corresponding application program has been installed.

The program obtaining module 680 is configured to retrieve an application program corresponding to the desktop data in the data center, download and install the retrieved application program, and then associate the desktop data with the installed application program, if the program determining module 640 determines that the corresponding application program has not been installed. In particular, the program obtaining module 680 may include a second information sending unit 683, a second program receiving unit 685 and a second program obtaining unit 687. The second information sending unit 683 is configured to send platform type information and application program information to the processing center, the second program receiving unit 685 is configured to receive an application program installation package fed back by the processing center according to the platform type information and the application program information. The second program obtaining unit 687 is configured to install the application program installation package received by the second program receiving unit 685, and associate the installed application program as the object currently pointed to by the shortcut.

In conclusion, the apparatus for desktop synchronization provided by the embodiment resolves the problem that the present cloud storage scheme could only simply store and synchronize files or folders, and achieves the effects that the desktop can be synchronized across platforms, and the files in the desktop data can be used, edited and modified after the synchronization across platforms, by associating the locally application program or the newly installed application program with the desktop data while synchronizing the desktop data. Meanwhile, the apparatus for desktop synchronization enables the terminal to simultaneously synchronize the application program information corresponding to the shortcut while synchronizing the shortcut, and thus resolves the problem that the shortcut is unusable when only the shortcut is synchronized, and achieves the effect that the shortcut will still be able to be used on the current terminal after the synchronization.

Embodiment IX

In order to further illustrate the apparatuses for desktop synchronization provided by the fifth embodiment to the eighth embodiment, a preferred embodiment (i.e., the ninth embodiment) is provided. The ninth embodiment may be combined with each of the fifth embodiment to the eighth embodiment to form a new embodiment.

Figure 10:
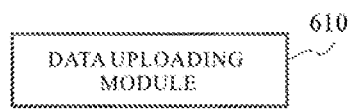
FIG. 10 is a structural schematic diagram showing an apparatus for desktop synchronization according to a ninth embodiment of the invention.

Referring to FIG. 10, FIG. 10 illustrates a structural schematic diagram showing an apparatus for desktop synchronization according to the ninth embodiment of the invention. The apparatus for desktop synchronization may be implemented as the terminal 120 as shown in FIG. 1 or a part of it. The apparatus for desktop synchronization includes a data uploading module 610.

The data uploading module 610 is configured to upload desktop synchronization data to the processing center, wherein the desktop synchronization data includes the desktop data or a combination of the desktop data and the corresponding unique identifying information. In particular, the data uploading module 610 may upload the desktop data to the processing center every predetermined time interval; or the data uploading module 610 may upload the desktop data to the processing center, when the desktop data changes, as desired.

The desktop data includes at least one set of data selected from a group consisting of: a file and an open mode corresponding to the file, a shortcut and a file or folder pointed to by the shortcut, and a shortcut and application program information corresponding to the shortcut.

In conclusion, the apparatus for desktop synchronization provided by the embodiment resolves the problem that the present cloud storage scheme could only simply store and synchronize files or folders, and achieves the effects that the desktop can be synchronized across platforms, and the files in the desktop data can be used, edited and modified after the synchronization across platforms, by uploading the desktop data including at least one set of data selected from a group consisting of: a file and an open mode corresponding to the file, a shortcut and a file or folder pointed to by the shortcut, as well as a shortcut and application program information corresponding to the shortcut.

It is noted that, in the description of desktop synchronization of the apparatus for desktop synchronization provided by the above embodiment, the division of the above-mentioned function modules are taken as an example to exemplarily illustrate the present application. However, in practical applications, the above-mentioned functions may be implemented by different modules as required. That is, internal structure of the apparatus may be divided into different function modules to implement all or some of the functions described above. Additionally, the embodiments providing the apparatus for desktop synchronization belong to the same concept as the embodiments providing the method for desktop synchronization. Detailed description of implementations of the apparatus for desktop synchronization may refer to the method embodiments, not going to repeat here.

Embodiment X

Figure 11:
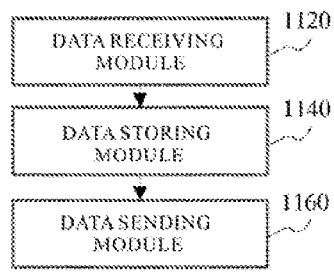
FIG. 11 is a structural schematic diagram showing a processing center according to a tenth embodiment of the invention.

Referring to FIG. 11, FIG. 11 illustrates a structural schematic diagram showing a processing center according to a tenth embodiment of the invention. The processing center includes at least one processor and may further include a data receiving module 1120, a data storing module 1140 and a data sending module 1160.

The receiving module 1120 is configured to receive desktop data uploaded by a terminal.

The data storing module 1140 is configured to store the desktop data received by the receiving module 1120.

The data sending module 1160 is configured to send the desktop data to the terminal.

The desktop data may include at least one set of data selected from a group consisting of: a file and an open mode corresponding to the file, a shortcut and a file or folder pointed to by the shortcut, and a shortcut and application program information corresponding to the shortcut.

Figure 12:
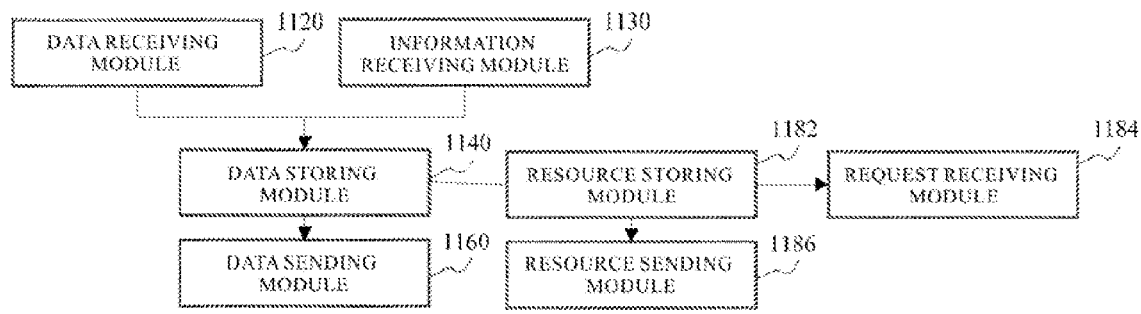
FIG. 12 is another structural schematic diagram showing the processing center according to the tenth embodiment of the invention.

Preferably, the processing center may further include an information receiving module 1130, as shown in FIG. 12.

The information receiving module 1130 is configured to receive unique identifying information corresponding to the desktop data uploaded by the terminal.

The data storing module 1140 is configured to store the desktop data according to the unique identifying information.

The data sending module 1160 is configured to send the desktop data to the terminal according to the unique identifying information More preferably, the processing center may further include a resource storing module 1182, a request receiving module 1184 and a resource sending module 1186. The resource storing module 1182 is configured to store at least one application program installation package and description information corresponding to the application program installation package, wherein the description information includes: application program information, an associated file type and corresponding platform type information. The request receiving module 1184 is configured to receive at least one selected from a group consisting of application program information, a file type and platform type information sent from the terminal. The resource sending module 1186 is configured to send an application program installation package, whose corresponding description information matches the information received by the request receiving module 1184, to the terminal.

In conclusion, the processing center provided by the embodiment resolves the problem that the present cloud storage scheme could only simply store and synchronize files or folders, achieves the effects that the desktop can be synchronized across platforms, and the files in the desktop data can be used, edited and modified after the synchronization across platforms, by synchronizing, among different terminals, desktop data including at least one set of data selected from a group consisting of: a file and an open mode corresponding to the file, a shortcut and a file or folder pointed to by the shortcut, and a shortcut and application program information corresponding to the shortcut.

Embodiment XI

This embodiment provides a system for desktop synchronization, which includes at least one terminal provided by the fifth embodiment to the ninth embodiment, and/or at least one processing center provided by the tenth embodiment.

Reference numbers of the embodiments of the present invention are only for description and in no way represent preferability levels of the embodiments.

Those skilled in the art may understand that all or some of the steps of the method for desktop synchronization shown in the above embodiments, all or some of the modules of the apparatus for desktop synchronization shown in the above embodiments, and/or all or some of the modules of the processing center shown in the above embodiments may be implemented by hardware, or may be implemented by hardware related to software program instructions. The program may be stored in a computer-readable storage medium, such as, a read-only memory (ROM), a disk or a compact disc (CD), and so on. For example, when the program containing program codes is executed on a computing device including processing elements (such as, a Central Processing Unit (CPU)) and storage elements (such as, a random-access memory (RAM), a read-only memory (ROM), etc.), the computing device can perform the method for desktop synchronization as shown in FIGS. 2-5, or construct the apparatus for desktop synchronization as shown in FIGS. 6-10 or the processing center as shown in FIGS. 11-12.

In addition, according to an implementation of the present invention, the method for desktop synchronization as shown in FIGS. 2-5 may correspondingly be performed by each of the modules in the apparatus for desktop synchronization as shown in FIGS. 6-10. According to another implementation of the present invention, all or some of the modules in the apparatus for desktop synchronization as shown in FIGS. 6-10 and the processing center as shown in FIGS. 11-12 may be combined as one or more additional units to implement corresponding functions; or a module or modules may be functionally divided into multiple smaller units to subdivide specific functions. For example, but with no limitation, the data receiving module 1120 and the data sending module 1160 shown in FIG. 11 may be combined into a single data transceiving unit, which may implement the same operations, without affecting the technical effect of the embodiments of the present invention.

The above described embodiments are merely exemplary embodiments of the invention, but not intended to limit the scope of the invention. The scope of the invention is defined by the attached claims as well as their equivalents. Any modifications, equivalent alternations and improvements that are made within the spirit and scope of the invention should be included in the protection scope of the invention.

What is claimed is:

1. A method for desktop synchronization, comprising:
obtaining desktop data from a processing center located in a cloud, the processing center comprising at least one server, wherein the desktop data comprises a at least one set of data selected from a group consisting of: a file and an open mode corresponding to the file; a shortcut and a file or folder pointed by the shortcut, and a shortcut and application program information corresponding to the shortcut;
determining whether an application program corresponding to the desktop data has been installed; and
associating the desktop data with a corresponding application program, if it is determined that the corresponding application program has been installed, and retrieving an application program corresponding to the desktop data from the processing center, downloading and installing the retrieved application program, and associating the desktop data with the installed application program, if it is determined that the corresponding application program has not been installed, wherein the step of obtaining the desktop data from the processing center comprises:

sending unique identifying information to the processing center, the unique identifying information comprising any one selected from a group consisting of a username, an e-mail address, a mobile number, a phone number and an instant communication number; and receiving desktop data corresponding to the unique identifying information fed back by the processing center.

2. The method for desktop synchronization according to claim 1, wherein:

upon determining that the desktop data comprises a file and an open mode corresponding to the file, wherein the step of retrieving an application program corresponding to the desktop data from the data center, downloading and installing the retrieved application program, and associating the desktop data with the installed application program comprises the steps of:

sending platform type information and a file type of the file to the processing center, receiving an application program installation package fed back by the processing center according to the platform type information and the file type of the file, and installing the application program installation package, and associating the installed application program as a current open mode of the file.

3. The method for desktop synchronization according to claim 1, wherein:

upon determining the desktop data comprises a shortcut and application program information corresponding to the shortcut, wherein the step of retrieving the application program corresponding to the desktop data from the data center, downloading and installing the retrieved application program, and associating the desktop data with the installed application program comprises:

sending platform type information and the application program information to the processing center, receiving an application program installation package fed back by the processing center according to the platform type information and the application program information, and installing the application program installation package, and associating the installed application program as an object currently pointed to by the shortcut.

4. The method for desktop synchronization according to claim 1, wherein:

upon determining the desktop data comprises a file and an open mode corresponding to the file, the step of determining whether the application program corresponding to the desktop data has been installed comprises: determining whether an application program corresponding to the open mode corresponding to the file has been installed; and wherein the step of associating the desktop data with the corresponding application program, if it is determined that the corresponding application program has been installed comprises: associating the installed application program as a current open mode of the file, if it is determined that the corresponding application program has been installed.

5. The method for desktop synchronization according to claim 4, wherein after the step of determining whether the application program corresponding to the open mode corresponding to the file has been installed, the method further comprises:

further determining whether an application program associated with a file type of the file has been installed, if it is determined that the corresponding application program has not been installed; and associating the installed application program associated with the file type of the file as the current open mode of the file, if it is determined that the application program associated with the file type of the file has been installed.

6. The method for desktop synchronization according to claim 1, wherein upon determining the desktop data comprises a shortcut and a file or folder pointed to by the shortcut, after the step of obtaining the desktop data from a processing center, the method for desktop synchronization further comprises:

requesting a storage path according to the shortcut;
receiving a specified storage path; and
storing the file or folder pointed to by the shortcut in the specified storage path.

7. The method for desktop synchronization according to claim 1, wherein:

upon determining the desktop data comprises a shortcut and application program information corresponding to the shortcut, the application program information comprising at least one selected from a group consisting of: a name, a version number and Message Digest Algorithm Fifth Edition (MD5) of the application program;

wherein the step of determining whether an application program corresponding to the desktop data has been installed comprises: determine whether an application program corresponding to the application program information has been installed; and wherein the step of associating the desktop data with the corresponding application program, if it is determined that the corresponding application program has been installed comprises: associating the installed application program as an object currently pointed to by the shortcut, if it is determined that the corresponding application program has been installed.

8. The method for desktop synchronization according to claim 1, wherein the method further comprises uploading desktop synchronization data to the processing center, wherein:

the desktop synchronization data comprises the desktop data or a combination of the desktop data and corresponding unique identifying information; and the desktop data comprises at least one set of data selected from a group consisting of: a file and an open mode corresponding to the file, a shortcut and a file or folder pointed to by the shortcut, and a shortcut and application program information corresponding to the shortcut.

9. A terminal, comprising:

a data obtaining module, configured to obtain desktop data from a processing center located in a cloud, the processing center comprising at least one server, wherein the desktop data comprises a at least one set of data selected from a group consisting of: a file and an open mode corresponding to the file; a shortcut and a file or folder pointed by the shortcut, and a shortcut and application program information corresponding to the shortcut;

a program determining module, configured to determine whether an application program corresponding to the desktop data has been installed; and a program associating module, configured to associate the desktop data with a corresponding application program, if it is determined by the program determining module that the corresponding application program has been installed, and retrieving an application program corresponding to the desktop data from the processing center, downloading and installing the retrieved application program, and associating the desktop data with the installed application program, if it is determined that the corresponding application program has not been installed wherein the data obtaining module comprises:
an identifying information sending unit, configured to send unique identifying information to the processing center, the unique identifying information comprising any one selected from a group consisting of a username, an e-mail address, a mobile number, a phone number and an instant communication number; and
   a desktop data receiving unit, configured to receive desktop data corresponding to the unique identifying information fed back by the processing center.

10. The terminal according to claim 9, wherein:
upon determining the desktop data comprises a file and an open mode corresponding to the file,
the program obtaining module comprises:
a first information sending unit, configured to send platform type information and a file type of the file to the processing center,
a first program receiving unit, configured to receive an application program installation package fed back by the processing center according to the platform type information and the file type of the file, and
a first program obtaining unit, configured to install the application program installation package, and associate the installed application program as a current open mode of the file.

11. The terminal according to claim 9, wherein:
upon determining the desktop data comprises a shortcut and application program information corresponding to the shortcut,
the program obtaining module comprises:
a second information sending unit, configured to send platform type information and application program information to the processing center,
a second program receiving unit, configured to receive an application program installation package fed back by the processing center according to the platform type information and the application program information, and
a second program obtaining unit, configured to install the application program installation package and associate the installed application program as an object currently pointed to by the shortcut.

12. The terminal according to claim 9, wherein:
upon determining the desktop data comprises a file and an open mode corresponding to the file, the program determining module is configured to determine whether an application program corresponding to the open mode corresponding to the file has been installed; and
wherein the program associating module is configured to associate the installed application program as a current open mode of the file, if it is determined by the program determining module that the corresponding application program has been installed.

13. The terminal according to claim 12, wherein:
the program determining module is further configured to further determine whether an application program associated with a file type of the file has been installed, if it is determined that the corresponding application program has not been installed; and
the program associating module is further configured to associate the installed application program associated with the file type of the file as the current open mode of the file, if it is determined by the program determining module that the application program associated with the file type of the file has been installed.

14. The terminal according to claim 9, wherein in the case that the desktop data comprises a shortcut and a file or folder pointed to by the shortcut, the terminal further comprises:
a path requesting module, configured to request a storage path according to the shortcut;
a path receiving module, configured to receive a specified storage path; and
a file storing module, configured to store the file or folder pointed to by the shortcut in the specified storage path.

15. The terminal according to claim 9, wherein:
upon determining the desktop data comprises a shortcut and application program information corresponding to the shortcut, the application program information comprising at least one selected from a group consisting of: a name, a version number and a Message Digest Algorithm Fifth Edition (MD5) of the application program;
wherein the program determining module is configured to determine whether an application program corresponding to the application program information has been installed; and
wherein the program associating module is configured to associate the installed application program as an object currently pointed to by the shortcut, if it is determined by the program determining module that the corresponding application program has been installed.

16. The terminal according to claim 9, wherein the terminal further comprises a data uploading module configured to upload desktop synchronization data to the processing center, wherein:
the desktop synchronization data comprises the desktop data or a combination of the desktop data and corresponding unique identifying information; and
the desktop data comprises at least one set of data selected from a group consisting of: a file and an open mode corresponding to the file, a shortcut and a file or folder pointed to by the shortcut, and a shortcut and application program information corresponding to the shortcut.

17. A non-transitory computer-readable storage medium with computer programs comprising program codes stored thereon, wherein the program codes, when being executed on a computing device, perform an operation for desktop synchronization, the operation comprising:
obtaining desktop data from a processing center located in a cloud, the processing center comprising at least one server, wherein the desktop data comprises a at least one set of data selected from a group consisting of: a file and an open mode corresponding to the file; a shortcut and a file or folder pointed by the shortcut, and a shortcut and application program information corresponding to the shortcut;
determining whether an application program corresponding to the desktop data has been installed; and associating the desktop data with t4ae-a corresponding application program, if it is determined that the corresponding application program has been installed, and retrieving an application program corresponding to the desktop data from the processing center, downloading and installing the retrieved application program, and associating the desktop data with the installed application program, if it is determined that the corresponding application program has not been installed, wherein the step of obtaining the desktop data from the processing center comprises:

sending unique identifying information to the processing center, the unique identifying information comprising any one selected from a group consisting of a username, an e-mail address, a mobile number, a phone number and an instant communication number; and receiving desktop data corresponding to the unique identifying information fed back by the processing center.

\* \* \* \* \*